No. 744,548. PATENTED NOV. 17, 1903.
H. J. HINDE.
AUTOMATIC RELEASE CLUTCH.
APPLICATION FILED JAN. 19, 1903.
NO MODEL. 2 SHEETS—SHEET 1.
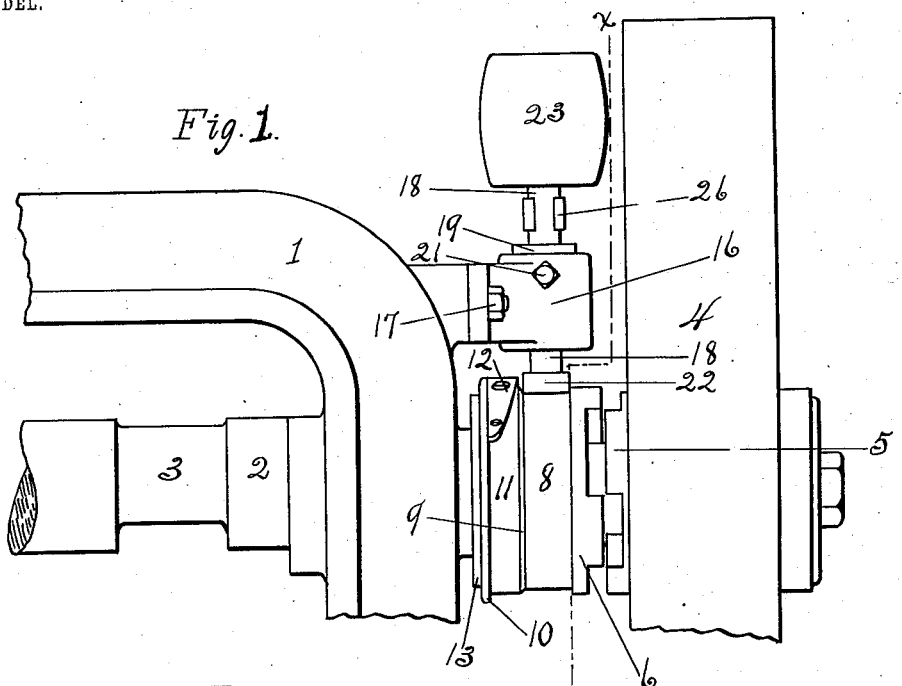
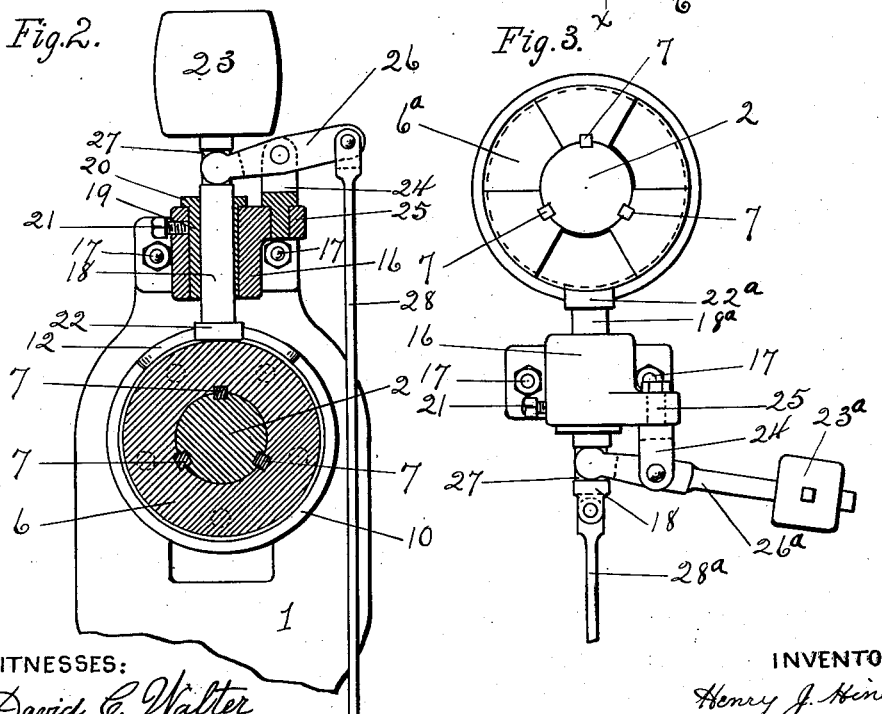
WITNESSES:
David C. Walter
Cornell Schreiber
INVENTOR.
Henry J. Hinde
By his attorneys.

No. 744,548. PATENTED NOV. 17, 1903.
H. J. HINDE.
AUTOMATIC RELEASE CLUTCH.
APPLICATION FILED JAN. 19, 1903.
NO MODEL. 2 SHEETS—SHEET 2.
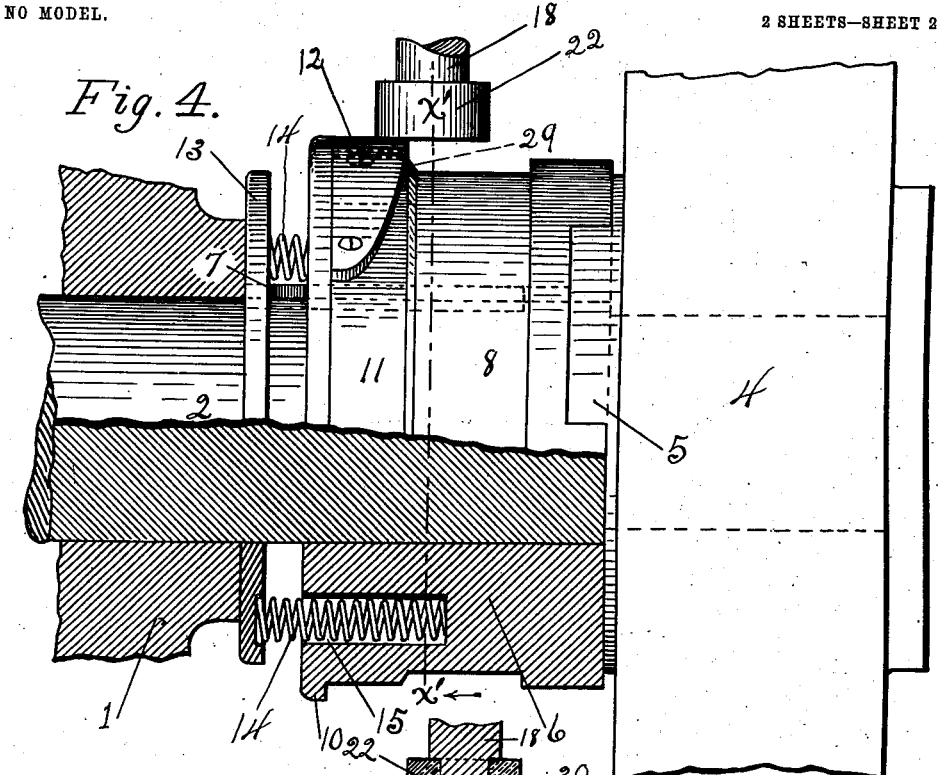
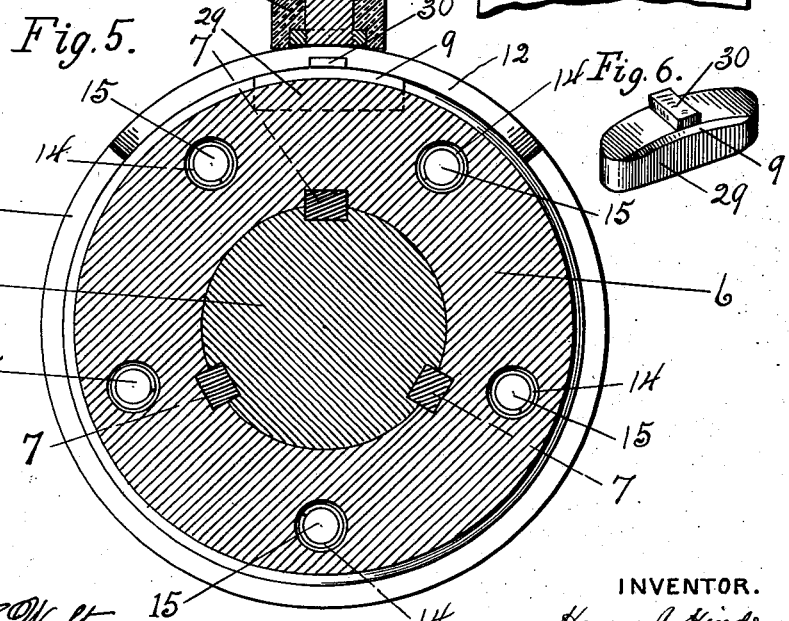
WITNESSES:
INVENTOR.

No. 744,548.

Patented November 17, 1903.

UNITED STATES PATENT OFFICE.

HENRY J. HINDE, OF TOLEDO, OHIO.

AUTOMATIC RELEASE-CLUTCH.

SPECIFICATION forming part of Letters Patent No. 744,548, dated November 17, 1903.

Application filed January 19, 1903. Serial No. 139,586. (No model.)

*To all whom it may concern:*

Be it known that I, HENRY J. HINDE, a citizen of the United States, residing at Toledo, in the county of Lucas and State of Ohio, have invented certain new and useful Improvements in Automatic Release-Clutches; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in release or stop clutches of the class more particularly adapted for use on power-presses and shears; and the object thereof is to provide a clutch having a positive and automatic release mechanism that will permit of but one revolution of the shaft and render a second stroke impossible after the operator has released the pressure of his foot from the treadle.

To this end the invention consists of certain novel features of construction, combination, and arrangement of parts, as will be hereinafter more fully described and claimed.

In the accompanying drawings, forming part of this specification, Figure 1 is a perspective view of a portion of the frame and shaft of a power-press, showing my clutch out of engagement with the clutch-wheel thereof. Fig. 2 is a cross-sectional view of the clutch, taken on the dotted line $xx$ in Fig. 1. Fig. 3 is a perspective end view of my clutch with clutch-wheel removed, showing a modified construction thereof. Fig. 4 is a partly-sectional detail view of my clutch, showing the same in engagement with the clutch-wheel of the press. Fig. 5 is a cross-sectional view of the clutch, taken on the dotted line $xx$ in Fig. 4; and Fig. 6 is a perspective view of a block of hardened steel with which I reinforce a portion of my clutch subjected to a greater amount of wear.

Like figures of reference mark the same parts in all the figures of the drawings.

Referring now to the drawings, 1 represents the frame of a power-press, 2 the shaft to which the press is eccentrically attached at 3, and 4 is the usual belt-pulley, which is loosely mounted on the outer end of the shaft 2 and is provided on the inner portion of its hub with the clutch-collar 5.

Having thus described the parts usual to machines of the class to which my invention is applied, I will now proceed to describe in detail my automatic clutch and the manner in which it operates.

The sliding sleeve 6, which is provided on its outer edge with suitable bosses to adapt it to engage with the clutch 5 of the pulley 4, is mounted on the shaft 2 and is prevented from lateral movement thereon by the feathers 7, which engage with corresponding recesses in said shaft and sleeve. A groove or guideway 8, having its inner shoulder beveled, as shown at 9, is centrally provided around the periphery of the sleeve 6, and a shoulder 10 is provided on the inner edge of said sleeve, thereby forming a second guideway 11 between the shoulder 10 and recess 8. It is not necessary, however, that the groove or guideway 8 should extend entirely around the sleeve 6, as it is only necessary to be provided at the point where the releasing member 19 of my clutch comes in contact with it, as hereinafter described. On the upper surface of the sleeve 6 and in the line of the guideway 11 is secured the curved steel plate or guide 12. The outer edge of this plate, as shown, gradually tapers away toward the shoulder 10 in both directions from its central or uppermost point, it being at that point of the same width as the said guideway.

Keyed to the shaft 2 in the same manner as the sleeve 6 in a position adjacent to the frame 1 and adapted to bear against the same is the collar 13, which forms a backing-plate for the coiled expansion-springs 14, spaced or located within the recesses 15, provided around the inner edge of the sleeve 6. The object of these springs is to force the sleeve when released, as hereinafter described, outward and away from the collar 13 to engage with the companion clutch on the pulley 4. It will thus be apparent that the sleeve 6 and collar 13 form a case for the springs 14 and prevent them from coming in contact with any part of the press-frame.

A boss 16 is secured above the sleeve 6 to a portion of the frame 1 by means of the bolts 17 and is provided with a vertical bore or bearing, which is in vertical alinement with the recess or guideway 8 of the sleeve 6 when said sleeve and collar 13 are flush. An eccentric bushing 19 is inserted in the said bore of the boss 16 to form a bearing for the vertical shaft or plunger 18, which is adapted to have a longitudinal or reciprocatory movement therein, the said bushing being supported in said bore by the annular shoulder 20, engaging with the upper surface of said boss 16 and prevented from turning therein by means of the binding-bolt 21.

22 is a vertically-disposed releasing-roll, which is carried on the lower end of the shaft 18 and adapted to travel in the guideways 8 and 11 of the sleeve 6 and is normally held in engagement with said sleeve by means of the weight 23, mounted on the upper end of said shaft. I do not confine myself, however, to the use of a roll 22, as the same purpose might be attained by the use of a shoe carried by the shaft 18 to engage with the sleeve 6.

Fulcrumed to the forked or bifurcated tenon 24, which is mortised or otherwise suitably secured to the projecting lug 25 of the boss 16, is the forked lever 26, the arms of which engage the shaft 18 and rest within suitable seats or notches 27, provided in said shaft 18 above the boss 16. A rod 28 connects the outer or free end of the lever 26 with a foot-treadle (not shown in drawings) on the lower part of the machine, thus providing means for operating the said lever and raising the roll 22 out of engagement with the guideway 8 of the sleeve 6.

In the operation of my invention it will be understood that the clutch-sleeve 6 is normally held out of engagement with the companion clutch 5 of the pulley 4, the springs 14 being compressed and the sleeve 6 held in flush position with the collar 13 by the roll 22, which is retained within the recess or guideway 8, provided in the sleeve 6 for its reception, by means of the weight 23, as shown in Figs. 1 and 2. When it is desired to have an operation of the press or machine to which my clutch is attached, the foot-treadle, to which the lever 26 is connected by means of the rod 28, is depressed, thus causing the vertical shaft 18, with the weight 23 thereon, to be raised a sufficient height to lift the roll 22 out of engagement with the recess or guideway 8 and above the plate 12 and permit the sliding sleeve or clutch 6 to be forced, by means of the expansion-springs 14, into engagement with the companion clutch 5 of the revolving pulley 4, as shown in Fig. 4. As the sleeve 6 engages with the pulley and is turned thereby the roll 22, impelled by the weight 23, drops from the plate 12 into the guideway 11 of the sleeve, the treadle being released, and travels in said guideway until the turning sleeve 6 causes it to come in contact with the tapering edge of said plate 12, thus forcing the sleeve out of engagement with said pulley and causing the said roll to slide off the beveled or chamfered shoulder 9 into the recess or guideway 8 of the sleeve. It will thus be apparent that my clutch will permit of but one revolution of the shaft 2 and will remain stationary except when the foot-treadle is depressed. If the guideway 8 or shoulder 9 thereof were not provided, the momentum of the sleeve 6 as it is being rotated when the two parts of the clutch are in engagement might cause it to carry the wider or central portion of block 12 beyond the roller 22, thereby permitting the sleeve 6 to immediately move forward to reëngage the constantly-rotating clutch member, and thus the complete stoppage of the machine at the end of each complete revolution of said sleeve 6 would not be obtained.

The lateral adjustment of the shaft 18 and roll 22 with relation to the sleeve 6 is provided for by means of the eccentric bushing 19, which when the binding-bolt 22 is loosened can be turned one way or the other, as it is desired, to change the position of the said shaft and roll to compensate for any wear the sleeve 6 and roll 22 may be subjected to by continual use, thus keeping the said sleeve and roll in proper relation to each other and preventing the clicking noise occasioned by reason of such wear.

As the friction occasioned by the roll 22 sliding from the raised portion or guideway 11 into the guideway 8 of the sleeve 6 causes a greater amount of wear at that point than on other parts of my clutch, I have found that by providing a highly-tempered steel block at such point the life of my clutch is greatly prolonged and its operation facilitated. I therefore insert the hardened block 29, Fig. 6, with a suitable socket, shown in the drawings by dotted lines, the said block having its upper surface curved to conform to the general contour of the sleeve 6 and the bevel 9 on its exposed edge. To more completely strengthen the curved plate 12 and prevent its being displaced on the sleeve 6 by reason of the roll 22 striking its tapered edge at every revolution of the shaft 2, I form or otherwise secure to the block 29 the projecting lug or key 30, which seats within a suitable recess provided in the under surface of said plate 12.

In Fig. 3 of the drawings, which shows a modified construction of my improved clutch, the operation and arrangement of the releasing mechanism are the reverse of that heretofore described, the shaft 18ª being mounted below the sleeve 6ª to adapt the roll 22ª, carried on its upper end, to engage with the under surface of the sleeve 6ª. The weight 23ª is carried on the outer end of the lever 26ª, which engages with the shaft 18ª. The rod 28ª, which connects with the foot-treadle of the machine, is attached to the lower end of the shaft 18ª. It will thus be seen that the weight 23ª, operating upon the lever 26ª, will have a tendency to normally retain the roll 22ª in engagement with the sleeve 6ª and that the depression of the foot-treadle will draw the roll out of engagement with the same.

It is obvious that such changes in the form, proportion, and minor details of construction of the parts as fairly fall within the spirit and scope of my invention may be made without departing from the spirit or sacrificing any of the advantages thereof.

Having thus described my invention, what I claim as new, and desire to secure by Letters Patent, is—

In a clutch mechanism, the combination with a frame and a shaft journaled therein, of a drive-pulley loosely journaled upon said shaft carrying a clutch member, a second clutch member having transversely and obliquely extending peripheral shoulders, a boss secured to the frame having a vertically-disposed opening extending through the same in alinement with the second clutch member, a bushing rotatably mounted in said opening having a guide-opening therein extending through the same eccentrically thereof, a plunger guided in the latter opening having a head at one end coacting with said peripheral shoulders of the second clutch member, and a weight and foot-lever mechanism associated with the opposite end of said plunger, substantially as described.

In testimony whereof I have signed my name to this specification in the presence of two subscribing witnesses.

HENRY J. HINDE.

Witnesses:
 CHAS. W. GREENING,
 WILBER A. OWEN.